(12) United States Patent
Sinsel (10) Patent No.: US 10,816,119 B2
(45) Date of Patent: Oct. 27, 2020

(54) UNIVERSAL SPRINKLER FITTING

(71) Applicant: Chris Sinsel, Boise, ID (US)

(72) Inventor: Chris Sinsel, Boise, ID (US)

( * ) Notice: Subject to any disclaimer, the term of this patent is extended or adjusted under 35 U.S.C. 154(b) by 0 days.

(21) Appl. No.: 16/569,351

(22) Filed: Sep. 12, 2019

(65) Prior Publication Data

US 2020/0003348 A1 Jan. 2, 2020

(51) Int. Cl.
*F16L 33/30* (2006.01)
*F16L 41/02* (2006.01)

(52) U.S. Cl.
CPC ............. *F16L 33/30* (2013.01); *F16L 41/021* (2013.01)

(58) Field of Classification Search
CPC ........................................................ F16L 33/30
USPC .......................................... 285/239, 242, 12
See application file for complete search history.

(56) References Cited

U.S. PATENT DOCUMENTS

| | | | |
|---|---|---|---|
| 928,237 A | 7/1909 | Baird | |
| 1,716,961 A * | 6/1929 | Hoffman | F16J 15/24 |
| | | | 277/344 |
| 2,311,708 A * | 2/1943 | Sundholm | F16K 3/085 |
| | | | 251/149.8 |
| 3,083,914 A * | 4/1963 | Smith | B05B 15/658 |
| | | | 239/203 |
| 3,408,099 A | 10/1968 | Appleton | |
| 3,866,950 A | 2/1975 | Skoch | |
| 4,173,989 A * | 11/1979 | Prest | F16L 43/02 |
| | | | 138/109 |
| 4,238,131 A * | 12/1980 | Cleveland | B29C 65/0672 |
| | | | 134/166 C |
| 4,266,813 A * | 5/1981 | Oliver | F16L 25/14 |
| | | | 285/12 |
| 4,660,860 A * | 4/1987 | Todd | F16L 25/0063 |
| | | | 285/12 |
| 4,688,833 A * | 8/1987 | Todd | F16L 25/0045 |
| | | | 285/12 |
| 4,712,812 A * | 12/1987 | Weir, III | F16L 25/14 |
| | | | 138/96 T |
| 4,722,556 A * | 2/1988 | Todd | F16L 25/0036 |
| | | | 285/12 |
| 4,875,719 A * | 10/1989 | Mylett | F16L 25/14 |
| | | | 285/239 |
| 4,971,366 A * | 11/1990 | Towsley | F16L 47/32 |
| | | | 285/12 |
| 5,141,255 A * | 8/1992 | Hanaoka | B05B 15/65 |
| | | | 285/4 |

(Continued)

*Primary Examiner* — David Bochna
(74) *Attorney, Agent, or Firm* — Shaver & Swanson, LLP; Scott D. Swanson (57) ABSTRACT

A sprinkler fitting configured to attach multiple sizes of sprinklers and possibly multiple sizes of flexible tubing. The sprinkler fitting has at least one end having two different sized threaded connectors configured to attach to different sized female sprinkler openings. A smaller connector is located distal on the end from the larger connector such that when the sprinkler fitting is attached to sprinkler head with a female opening having threads that correspond to the threads of the larger connector, the smaller connector is positioned without attachment to any threads within the female opening of the sprinkler head. The sprinkler head connector has at least a first connector and a second connector to attach multiple sizes of sprinklers. If included, the flexible tubing fitting connector has at least a first connector and a second connector to attach multiple sizes of flexible tubing.

6 Claims, 6 Drawing Sheets

(56) References Cited

U.S. PATENT DOCUMENTS

| | | | | |
|---|---|---|---|---|
| 5,333,910 A * | 8/1994 | Bailey | ............... | F16L 37/05 |
| | | | | 285/12 |
| 5,487,571 A * | 1/1996 | Robertson | ............... | F16L 33/30 |
| | | | | 285/239 |
| 5,569,222 A | 10/1996 | Haselhorst | | |
| 5,762,671 A | 6/1998 | Farrow | | |
| 5,944,359 A * | 8/1999 | Andronaco | ......... | F16L 33/2073 |
| | | | | 285/222.4 |
| D441,435 S * | 5/2001 | Patteson | ............... | D23/262 |
| D453,817 S * | 2/2002 | Patteson | ............... | D23/262 |
| 6,505,866 B1 * | 1/2003 | Nakamura | ......... | F16L 37/0985 |
| | | | | 285/239 |
| 6,783,160 B2 * | 8/2004 | Rowley | ............... | F16L 13/143 |
| | | | | 285/148.16 |
| 6,899,355 B2 | 5/2005 | Klein | | |
| 7,163,238 B1 * | 1/2007 | Mittersteiner | ........ | F16L 33/225 |
| | | | | 285/242 |
| 7,325,839 B2 * | 2/2008 | Slentz | ............... | F16L 33/30 |
| | | | | 285/189 |
| 7,717,475 B2 * | 5/2010 | Savelle, Jr. | ............. | F16L 33/24 |
| | | | | 285/179 |
| 7,722,091 B1 * | 5/2010 | Brockington | ............ | E03F 1/00 |
| | | | | 285/361 |
| 8,898,876 B2 | 12/2014 | Feith | | |
| 8,950,789 B2 | 2/2015 | Rowshan | | |
| 9,835,282 B2 * | 12/2017 | Boaz | ........................ | E03B 7/08 |
| 2002/0089175 A1 * | 7/2002 | Ericksen | ............... | F16L 33/30 |
| | | | | 285/61 |
| 2002/0167166 A1 * | 11/2002 | Klein | ............... | F16L 33/227 |
| | | | | 285/239 |
| 2003/0094808 A1 * | 5/2003 | Giordano | ............... | F17D 5/02 |
| | | | | 285/12 |
| 2004/0155459 A1 * | 8/2004 | Katayama | ............... | F16L 31/00 |
| | | | | 285/256 |
| 2006/0006643 A1 * | 1/2006 | Schultz | ............... | F16L 33/24 |
| | | | | 285/239 |
| 2010/0276425 A1 * | 11/2010 | Stobbart | ............ | F16L 55/1152 |
| | | | | 220/327 |
| 2011/0285126 A1 * | 11/2011 | Jahan | ............... | B05B 1/044 |
| | | | | 285/305 |

\* cited by examiner

UNIVERSAL SPRINKLER FITTING

TECHNICAL FIELD

The presently disclosed technology relates generally to irrigation fittings, and more particularly to irrigation fittings for connecting varying sized irrigation components including sprinkler heads and possibly flexible tubing for fluid delivery.

BACKGROUND OF THE INVENTION

Sprinkler heads are used to irrigate crops, lawns, landscapes, golf courses, and other areas. Fluid such as water is provided from a source and delivered to a sprinkler head via a network of flexible tubing and valves. The sprinkler head(s) then distribute the fluid typically via a spray nozzle positioned in the sprinkler head. As used herein the term "fitting" is generally used to refer to a coupling element, such as a tee, elbow, or linear coupling element while the term "connector" is utilized to refer to a connecting portion of each fitting, such as the threads at an end of a threaded fitting or the barbs at an end of a barbed fitting.

Sprinkler heads come in a variety of sizes and typically have a threaded female connector for connecting to a fitting which in turn connects to an irrigation piping. A preferred material for use as an irrigation piping is a flexible tubing. Sprinkler heads with a female threaded connector have approximately one-inch (1") worth of threads inside the sprinkler for fittings to connect to. The diameter of the female threaded connectors vary among different sprinkler heads but are typically one-half inch (½") or three-fourths inch (¾").

The fitting typically will utilize a second end having a connector for connecting to the flexible irrigation tubing. Flexible irrigation tubing is typically manufactured in a variety of sizes based on its diameter and needed length. These measurements are standard piping and fitting sizes in the irrigation industry and constitute the external diameter of the piping. Thus, when a connector of a fitting is labeled as being ½" or one-half inch, the meaning is that it is to be used with the corresponding sprinkler head or flexible tubing that is labeled ½" or one-half inch in the industry, typically referring to the diameter. The same nomenclature is also used with various sizes of sprinkler heads and flexible tubing in the. The diameter of the irrigation flexible tubing used in a project varies, depending on factors such as volume of fluid desired to be distributed, location of the irrigation flexible tubing, and type of flexible tubing used. Typically flexible irrigation tubing is connected to a barbed fitting by sliding the tubing over the barbs of the fitting. Depending on the flexible tubing, it may or may not need a clamp to secure the connection between the flexible tubing and the fitting.

In order to attach a sprinkler head to a fitting, the correct sized fitting for that flexible tubing must be used. This requires matching the appropriate diameter fitting with the appropriate element to which it is connected. To facilitate the variety of sizes requires an irrigation worker to carry multiple sized fittings or risk having to spend time in acquiring different sized fittings. This can be costly and an inefficient use of time and resources. What is needed is a series of fittings such that can each be used for varying sizes of sprinkler heads and/or varying sizes of flexible irrigation tubing.

SUMMARY OF THE INVENTION

The purpose of the summary is to enable the public, and especially the scientists, engineers, and practitioners in the art who are not familiar with patent or legal terms or phraseology, to determine quickly from a cursory inspection, the nature and essence of the technical disclosure of the application. The summary is neither intended to define the inventive concept(s) of the application, which is measured by the claims, nor is it intended to be limiting as to the scope of the inventive concept(s) in any way.

What is disclosed is an irrigation fitting configured for connecting two or more components of an irrigation system. The components include, but are not limited to, sprinkler heads and flexible tubing. The fittings include a first end and a second end. The first end comprises of at least one size of connectors for connecting to a first component of an irrigation system. The second end comprises two different sized connectors for connecting to a second component of an irrigation system. The connectors include threads, such that two different sized threads are included on the end of the fitting. The connectors can include barbs, such that two different sized barbs are included on a different end of the fitting from the threaded connectors. The connectors typically are male connectors and are configured such that the smaller connector is distal to the larger connector. The fitting can be configured to connect to more than two irrigation components. This includes, but is not limited to, a T-shaped fitting which is configured to attach to a sprinkler head and, for example, two sections of flexible tubing. A further example of a fitting configured to attach to two components includes, but is not limited to, an elbow fitting which attaches a sprinkler head to a piece of flexible tubing.

What is further disclosed is a sprinkler head connector configured for connecting a sprinkler head to a flexible tubing. The sprinkler head connector has a flexible tubing end configured to attach to a flexible tubing and a sprinkler end configured to attach to a sprinkler head. The sprinkler end has a first sprinkler connector and a second sprinkler connector. The first sprinkler connector and the second sprinkler connector are preferably threaded to screw into the sprinkler heads.

The first sprinkler connector is positioned proximate to the end of the sprinkler end. The first sprinkler connector has a small diameter configured for connecting to a female connector opening of a sprinkler with a female connector that has a small diameter.

The second sprinkler connector is positioned adjacent to the first sprinkler connector. The second sprinkler connector has a diameter larger than the first sprinkler connector. The larger diameter of the second sprinkler connector is configured for connecting to female connector opening of a sprinkler with a female connector that has a large diameter.

The sprinkler end is configured such that when the first sprinkler connector is attached to the sprinkler head with a smaller female connector, the second sprinkler connector fits against the sprinkler head. The sprinkler end is further configured such that when the second sprinkler connector is attached to the sprinkler head with a larger female connector, the first sprinkler connector is positioned within the larger female connector.

The flexible tubing end of the sprinkler head connector has a first flexible tubing connector and possibly a second flexible tubing connector. The first flexible tubing connector and the second flexible tubing connector are preferably but not limited to barb fittings configured to create a fluid tight seal to the flexible tubing each fitting attaches. Depending on the flexible tubing utilized, a clamp may be required to create the fluid tight seal.

Still other features and advantages of the claimed invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the description of the preferred embodiments is to be regarded as illustrative in nature, and not as restrictive in nature.

DETAILED DESCRIPTION OF THE PREFERRED EMBODIMENTS

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Figure 1:
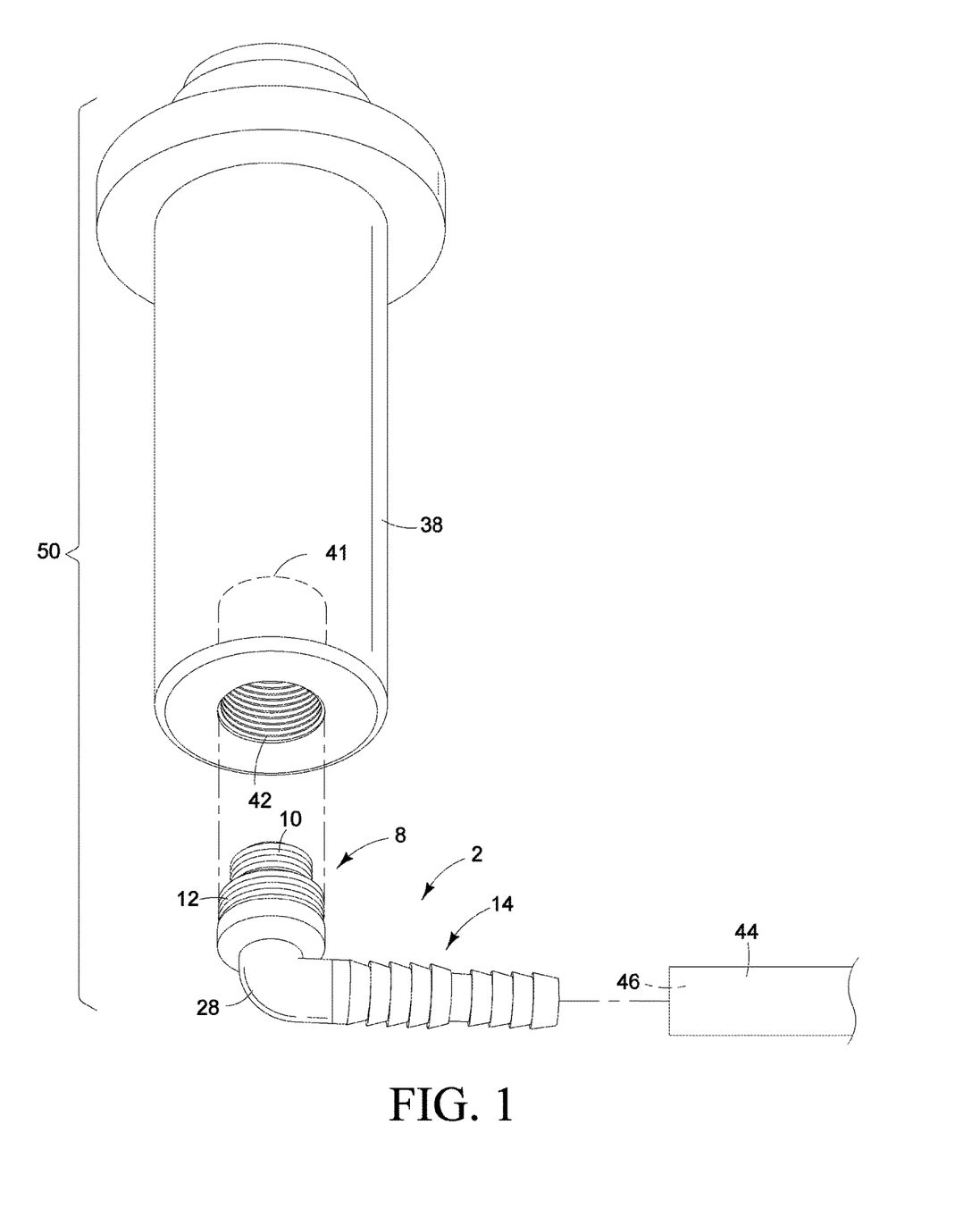
FIG. 1 is an exploded perspective view of a preferred embodiment of an irrigation fitting, a sprinkler head, and a segment of flexible tubing.

FIG. 1 illustrates a preferred embodiment of the irrigation fitting 2. The irrigation fitting 2 preferably has a sprinkler end 8 with a small sprinkler connector 10 and a large sprinkler connector 12. The irrigation fitting 2 has a flexible tubing end 14 configured for connecting to a flexible tubing 44 by being inserted into the diameter 46.

Further illustrated in FIG. 1 is a sprinkler head 38 with a large female connector 42. In a preferred embodiment, the large sprinkler connector 12 is configured for connecting to the large female connector. The dashed line 41 illustrates the internal size of the opening 42. The height of dashed line 41 is equivalent to the height h2 shown in FIG. 5. As shown, the entirety of the smaller diameter threaded male connector 10 is configured to fit within the opening 41. The larger diameter threaded male connector 12 is configured to engage with threads of the female opening 42 to secure the irrigation fitting to the sprinkler head. Each of the threaded male connectors 10, 12 is configured to engage approximately one half of the standard depth (or height) of a female opening of a sprinkler head, as shown by comparing h1 of FIG. 5 to h2 of FIG. 5.

Figure 2:
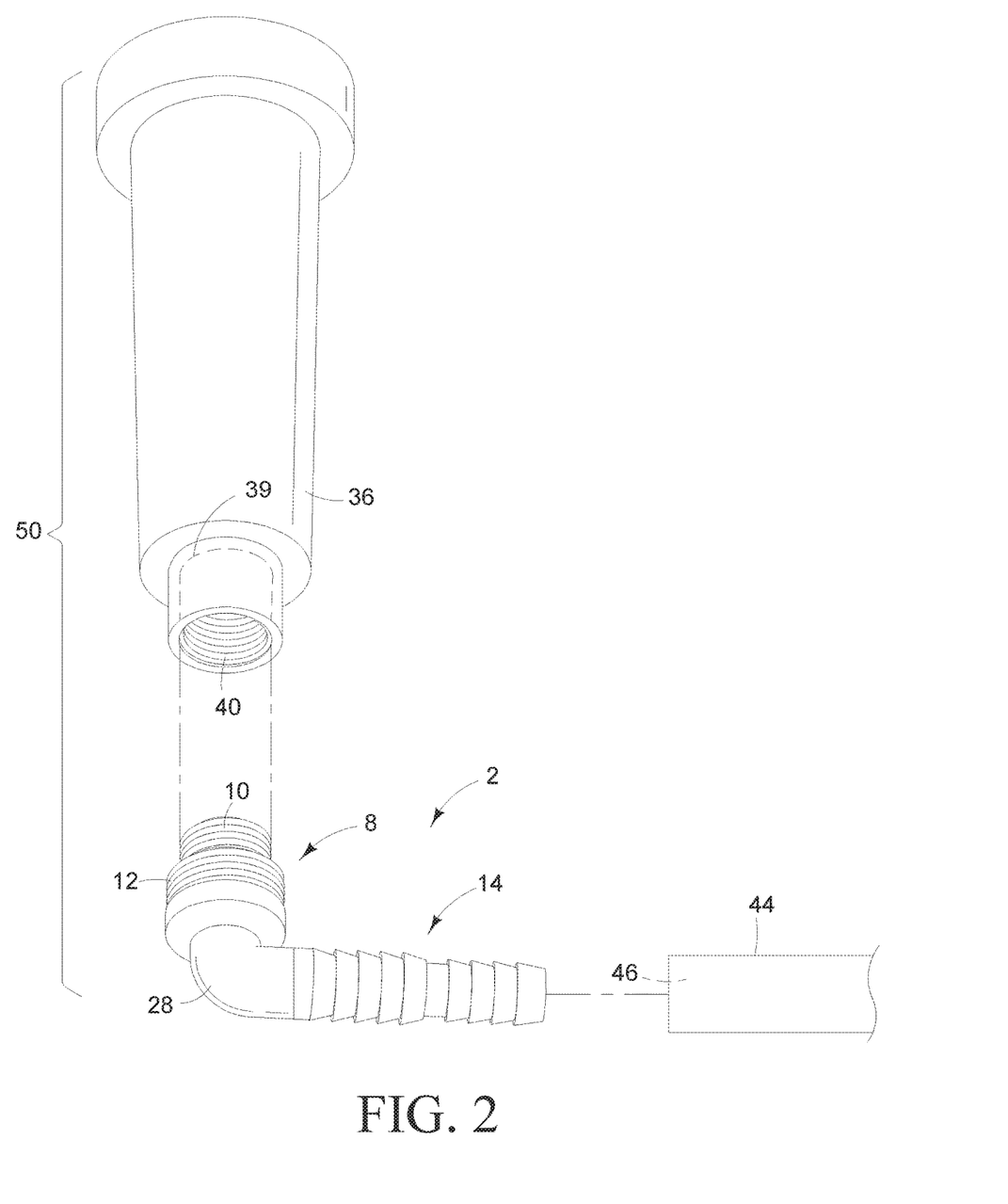
FIG. 2 is an exploded perspective view of a preferred embodiment of an irrigation fitting, a small sprinkler head, and a segment of flexible tubing.

FIG. 2 illustrates a preferred embodiment of the irrigation fitting 2 and a sprinkler head 36 with a small female connector 40. The small sprinkler connector 10 is configured to attach to the small female connector 40. When the small sprinkler connector 10 is attached to the small female connector 40, the large sprinkler connector 12 fits adjacent to the bottom of the small female connector 40. Dashed line 39 illustrates the approximate depth of the female opening of the sprinkler head 36. The connector 2 threads into the opening 40 until the body of the female opening meets the lip (11 in FIGS. 3 and 4) at the separation of the small threaded male connector 10 and the large threaded male connector 12.

Figure 3:
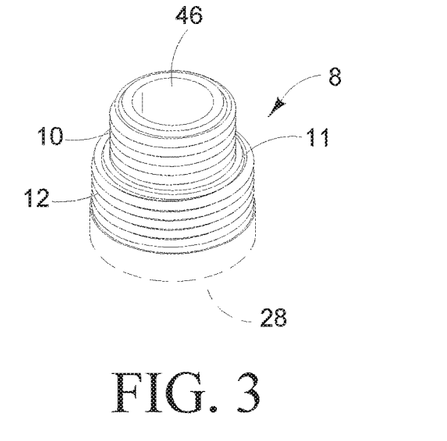
FIG. 3 is a perspective view of an embodiment of an irrigation fitting.
Figure 4:
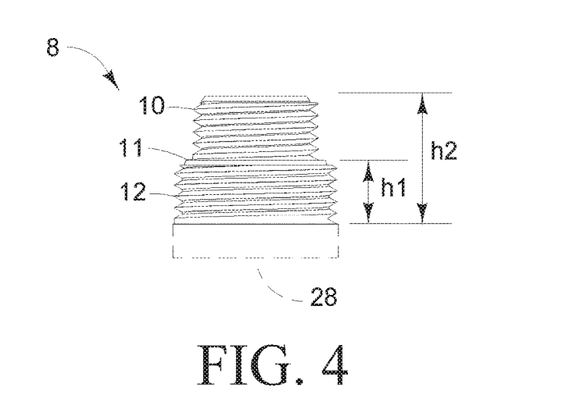
FIG. 4 is a side view of the irrigation fitting shown in FIG. 3.

FIGS. 3 and 4 illustrate a preferred embodiment of the sprinkler end 8 attached to a portion of the body 28 of the irrigation fitting (not shown in its entirety). FIG. 3 illustrates the sprinkler end 8 having a diameter 46 that allows for the flow of fluid. FIGS. 3 and 4 further illustrate the small sprinkler connector 10 positioned proximate to the sprinkler end 8 and the large sprinkler connector 12 positioned adjacent to the small sprinkler connector 10. FIGS. 3 and 4 illustrate a lip 11 that results from the difference in size of the connectors 10, 12. The lip is created by the step down in diameter between the larger thread and the smaller thread and thus is a lip that is radial to the tubular connector (or perpendicular to the length of the second end of the connector). The threads of the small connector 10 are continuous to this lip such that the adapter can be threaded into a small diameter female sprinkler opening until the lip meets the body of the sprinkler head.

FIG. 4 illustrates the preferred height of the sprinkler end 8. The small sprinkler connector 10 preferably has a height H1 that is approximately half of the height H2 of a female connector for a sprinkler head. The height H2 is also preferably the height of the large sprinkler connector 12 and the small sprinkler connector 10 combined.

In a preferred embodiment, the small sprinkler connector 10 and the large sprinkler connector 12 are threaded for connection to the female connector of a sprinkler head.

Figure 5:
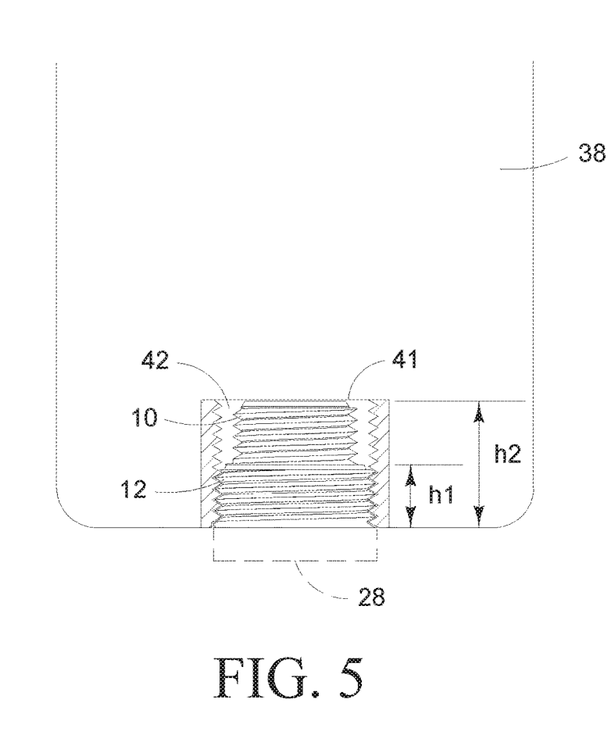
FIG. 5 is a section view of a sprinkler head with an irrigation fitting.
Figure 6:
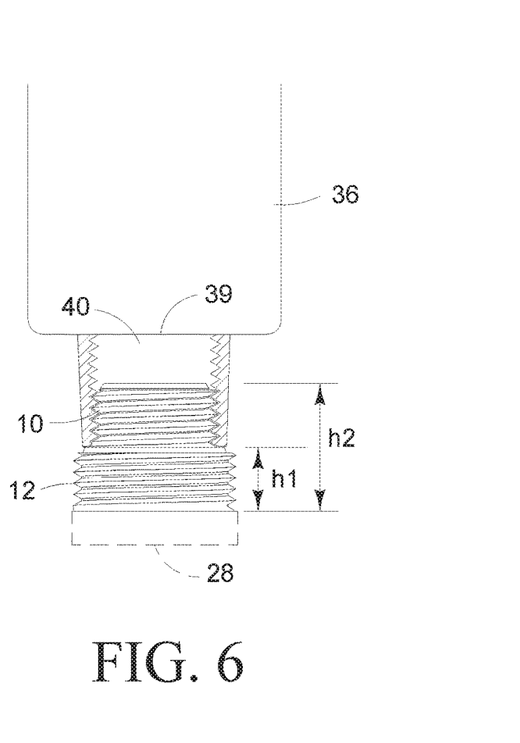
FIG. 6 is a section view of a sprinkler head with an irrigation fitting.

FIGS. 5 and 6 illustrate section views of the connector attached to a large diameter female opening of a sprinkler head (FIG. 5) and the connector attached to a small diameter female opening of a sprinkler head (FIG. 6).

FIGS. 7-10 illustrate embodiments of a flexible tubing connector 14, 16 for connecting to flexible tubing (not illustrated). The depicted flexible tubing connector ends are preferably configured to attach to multiple sized tubing in order to attach a variety of sizes of flexible tubing. The flexible tubing connector end 18 has an opening 46 that has a diameter that allows for passage of fluid. In a preferred embodiment, the flexible tubing connector end 18 has a small flexible tubing connector 24 and a large flexible tubing connector 26.

Figure 7:
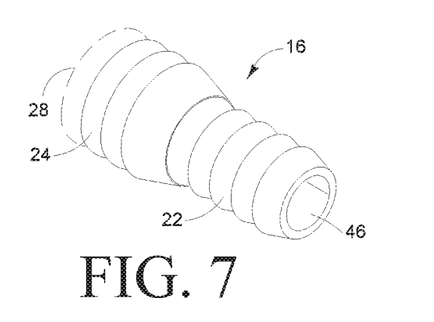
FIG. 7 is a perspective view of an embodiment of an irrigation fitting.
Figure 8:
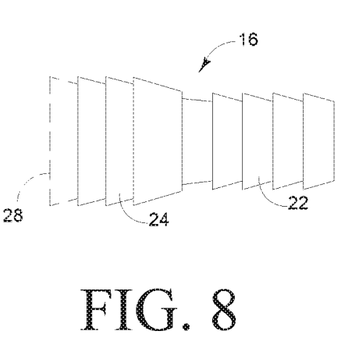
FIG. 8 is a side view of the irrigation fitting shown in FIG. 8.

Illustrated in FIGS. 7-8 is a second small flexible tubing connector 22 that is configured to attach to the small flexible tubing connector 24. The second small flexible tubing connector 22 has a diameter 46 less than that of the small flexible tubing connector 24. This second small flexible tubing connector 22 is configured to attach to flexible tubing with a smaller diameter.

Figure 9:
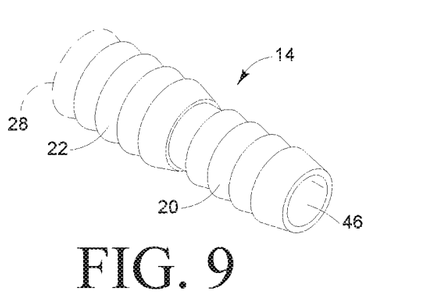
FIG. 9 is a perspective view of an embodiment of an irrigation fitting.
Figure 10:
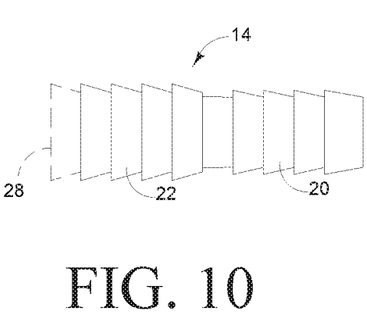
FIG. 10 is a side view of the irrigation fitting shown in FIG. 9.
Figure 11:
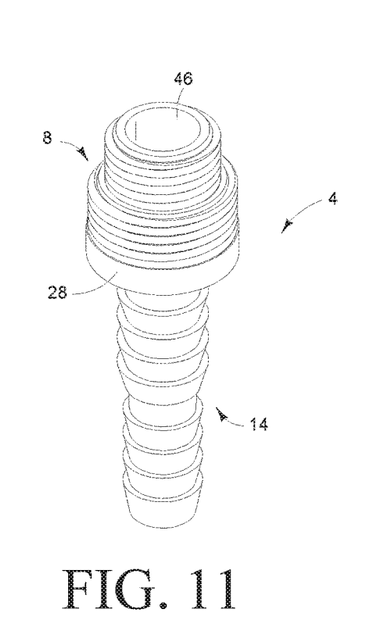
FIG. 11 is a perspective view of an embodiment of an irrigation fitting.
Figure 12:
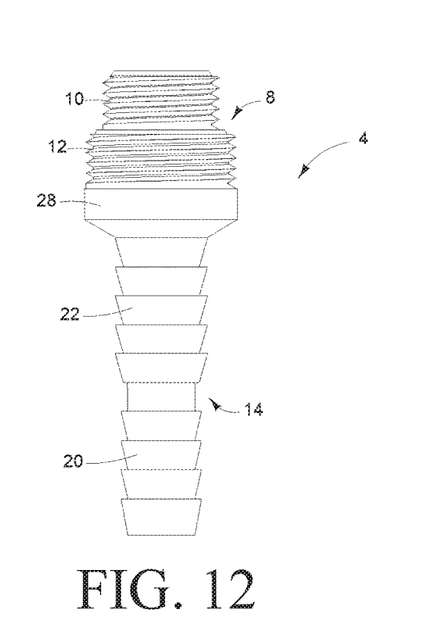
FIG. 12 is a side view of the irrigation fitting shown in FIG. 11.

Illustrated in FIGS. 9-10 is a third small flexible tubing connector 20 that is configured to attach to the second small flexible tubing connector 22. The third small flexible tubing connector 20 has a diameter 46 less than that of the small flexible tubing connector.

In a preferred embodiment, the flexible tubing connector end is barbed for a fluid tight connection with flexible tubing.

FIGS. 11-16 illustrate alternate preferred embodiments of an irrigation fitting. FIG. 11-16 illustrate an alternate embodiment of the irrigation fitting 4 with a short body 28. The irrigation fitting 4 has a sprinkler end 8 configured to attach to sprinkler heads. The sprinkler end 8 has a small sprinkler connector 10 configured to attach to a sprinkler head with a small female connector. The sprinkler head connector has a large sprinkler connector 12 configured to attach a sprinkler head with a large female connector. The irrigation fitting 4 has a flexible tubing end 14 configured for connecting to a flexible tubing (not shown). The flexible tubing end 14 has a small flexible tubing connector 20 configured for connecting a flexible tubing with a small diameter and a large flexible tubing connector 22 configured for connecting a flexible tubing with a larger diameter.

Figure 13:
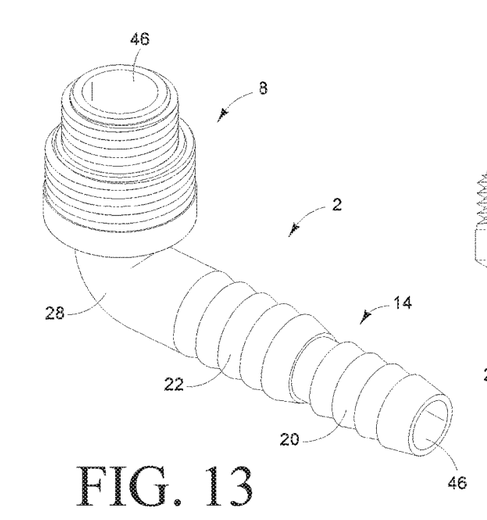
FIG. 13 is a perspective view of an embodiment of an irrigation fitting.
Figure 14:
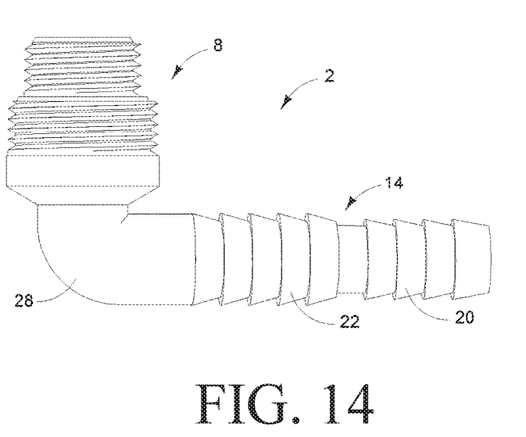
FIG. 14 is a side view of the irrigation fitting shown in FIG. 13.

FIG. 13-14 illustrate an alternate preferred embodiment of a fitting 2 with a body 28 being curved approximately 90 degrees. The irrigation fitting 2 has a sprinkler end 8 configured to attach to sprinkler heads. The sprinkler end 8 has a small sprinkler connector 10 configured to attach to a sprinkler head with a small female connector. The fitting has a large sprinkler connector 12 configured to attach a sprinkler head with a large female connector. The irrigation fitting 4 has a flexible tubing end 14 configured for connecting to a flexible tubing (not shown). The flexible tubing end 14 has a small flexible tubing connector 20 configured for connecting a flexible tubing with a small diameter and a large flexible tubing connector 22 configured for connecting a flexible tubing with a larger diameter.

Figure 15:
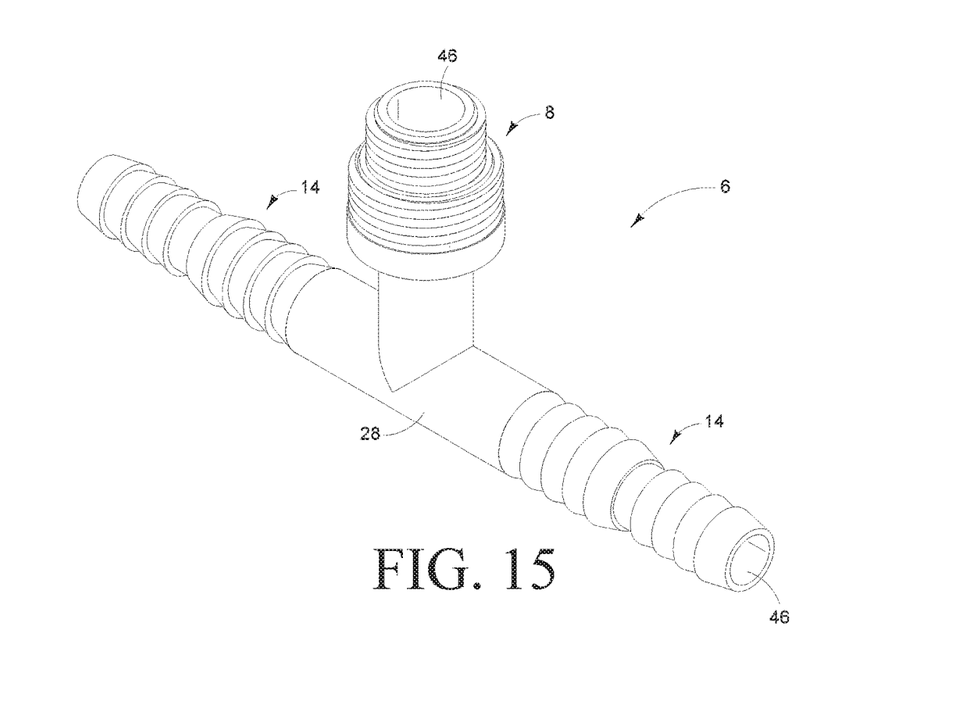
FIG. 15 is a perspective view of an embodiment of an irrigation fitting.
Figure 16:
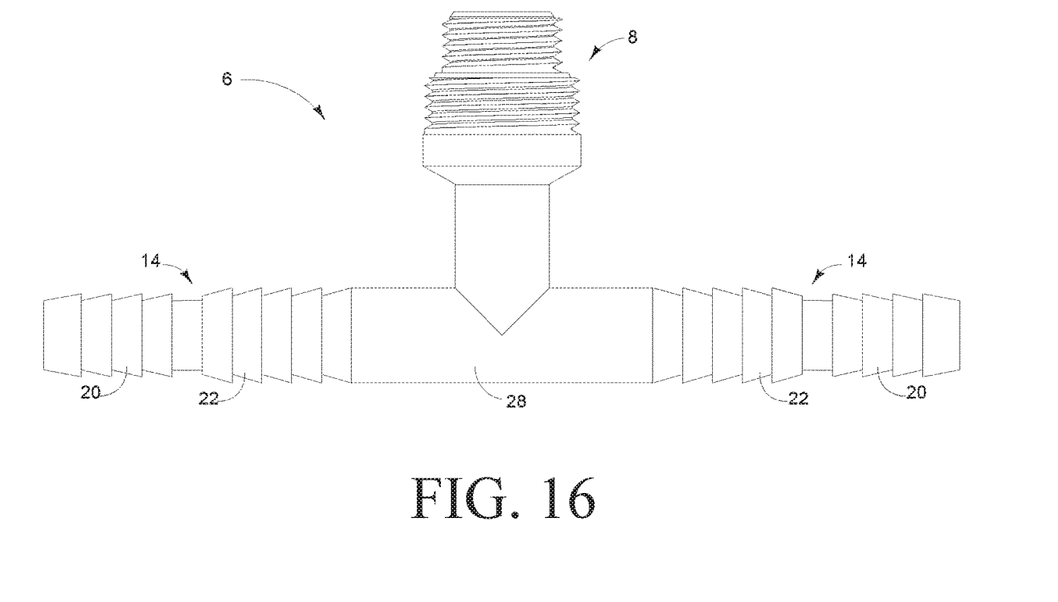
FIG. 16 is a side view of the irrigation fitting shown in FIG. 15.

FIGS. 15-16 illustrate an alternate embodiment of the irrigation fitting 6 with a body 28 in a T-shape. The irrigation fitting 6 has a sprinkler end 8 configured to attach to sprinkler heads. The sprinkler end 8 has a small sprinkler connector configured to attach to a sprinkler head with a small female connector. The irrigation fitting has a large sprinkler connector 12 configured to attach a sprinkler head with a large female connector. The irrigation fitting 6 has two flexible tubing ends 14 configured for connecting to two segments of flexible tubing (not shown) by being inserted into the diameter 46. This allows for the irrigation fitting 6 to be inserted into a flexible tubing line and have a system of sprinklers throughout a field or yard. The flexible tubing end 14 has a small flexible tubing connector 20 configured for connecting a flexible tubing with a small diameter and a large flexible tubing connector 22 configured for connecting a flexible tubing with a larger diameter.

In a preferred embodiment, the flexible tubing ends have a first and a second flexible tubing connector. In an alternate embodiment, the flexible tubing end is configured such that a single fitting can be utilized with multiple sizes of irrigation pipe.

While certain exemplary embodiments are shown in the Figures and described in this disclosure, it is to be distinctly understood that the presently disclosed inventive concept(s) is not limited thereto but may be variously embodied to practice within the scope of this disclosure. From the foregoing description, it will be apparent that various changes may be made without departing from the spirit and scope of the disclosure as defined herein.

What is claimed is:

1. An irrigation fitting for connecting two or more components of an irrigation system, said irrigation fitting comprising:
    a first end configured for the inflow of a fluid;
    a tubular second end comprising two different sized male threaded connectors comprising a first male threaded connector and a second male threaded connector for connecting to a female threaded opening of a sprinkler head, wherein said male threaded connectors are each configured for connecting to a different sized female threaded openings of sprinkler heads, wherein said first male threaded connector and said second male threaded connector are linearly positioned in a continuous arrangement such that said first male threaded connector is positioned distal from a center of said irrigation fitting than said second male threaded connector, wherein said first male threaded connector and said second male threaded connector are configured such that when said second male threaded connector is threadingly connected to a female opening of a sprinkler head said first male threaded connector is positioned within the female opening of the sprinkler head and free of threaded engagement with said female connector, wherein said threads of said first male threaded connector are each continuous to a lip separating said first male threaded connector from said second male threaded connector, wherein said lip extending radially between said first male threaded connector and said second male threaded connector;
    an intermediate section between said first end and said second end, wherein said intermediate section defining a tube and configured for the flow there through of a fluid.

2. The irrigation fitting of claim 1 wherein said first end comprises a series of barbs.

3. The irrigation fitting of claim 1 wherein said fitting defines a T-shape, wherein said fitting comprises a third end configured for fluid outflow.

4. The irrigation fitting of claim 1, wherein said fitting comprises an elbow fitting.

5. The irrigation fitting of claim 1 wherein said fitting comprises an adapter for connecting a sprinkler head to a length of flexible tubing.

6. The irrigation fitting of claim 1, wherein said first male threaded connector of said second end comprises a series of threads configured to connect to a sprinkler head having a female threaded opening having a diameter of ½ inch, wherein said second male connector of said second end comprises a series of threads configured to connect to a sprinkler head having a female threaded opening having a diameter of ¾ inches.

* * * * *